US012688736B2

(12) United States Patent
Cawse

(10) Patent No.: US 12,688,736 B2
(45) Date of Patent: *Jul. 21, 2026

(54) COLLECTION AND DISTRIBUTION OF TELEMATICS DATA

(71) Applicant: Geotab Inc., Oakville (CA)

(72) Inventor: Neil Charles Cawse, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/817,712

(22) Filed: Aug. 28, 2024

(65) Prior Publication Data

US 2024/0428625 A1     Dec. 26, 2024

Related U.S. Application Data

(63) Continuation of application No. 17/684,773, filed on Mar. 2, 2022, now Pat. No. 12,112,586.

(60) Provisional application No. 63/292,505, filed on Dec. 22, 2021, provisional application No. 63/162,364, filed on Mar. 17, 2021.

(51) Int. Cl.
| | |
|---|---|
| *G06F 16/00* | (2019.01) |
| *G06F 16/23* | (2019.01) |
| *G06F 16/25* | (2019.01) |
| *G06F 21/62* | (2013.01) |
| *G07C 5/00* | (2006.01) |

(52) U.S. Cl.
CPC ......... *G07C 5/008* (2013.01); *G06F 16/2379* (2019.01); *G06F 16/258* (2019.01); *G06F 21/62* (2013.01)

(58) Field of Classification Search
CPC ..... G06F 16/2379; G06F 16/258; G06F 21/62
See application file for complete search history.

(56) References Cited

U.S. PATENT DOCUMENTS

| | | |
|---|---|---|
| 7,701,360 B1 | 4/2010 | Tannenbaum et al. |
| 9,754,425 B1 | 9/2017 | Iqbal et al. |
| (Continued) | | |

OTHER PUBLICATIONS

Extended European Search Report for European Application No. 22160968.8, dated Aug. 12, 2022.

(Continued)

*Primary Examiner* — Cheryl Lewis
(74) *Attorney, Agent, or Firm* — Wolf, Greenfield & Sacks, P.C.

(57) ABSTRACT

Described herein are methods of processing telematics data that include receiving initial telematics data related to a vehicle from a telematics device and processing the initial telematics data to generate processed telematics data. For each recipient of a plurality of recipients, the methods additionally include determining, from the initial telematics data and/or the processed telematics data, data that is to be made accessible to a recipient. Determining the data that is to be made accessible to the recipient comprises evaluating one or more constraints for the recipient that constrain what data the recipient is permitted to receive and determining what data has been requested to be provided to the recipient. For each recipient of a plurality of recipients, the methods additionally include distributing the determined data to the recipient. Also described herein are systems for processing telematics data in accordance with the described methods.

19 Claims, 6 Drawing Sheets

(56) References Cited

U.S. PATENT DOCUMENTS

| 10,449,967 | B1 | 10/2019 | Ferguson |
| 10,559,038 | B1 | 2/2020 | Chen et al. |
| 10,623,401 | B1 | 4/2020 | Yager |
| 11,312,385 | B1 | 4/2022 | Russo et al. |
| 11,615,478 | B2 * | 3/2023 | Chintakindi .......... H04W 4/029 |
| | | | 705/4 |
| 11,675,042 | B1 | 6/2023 | Lloyd et al. |
| 11,997,181 | B1 | 5/2024 | Davis et al. |
| 12,058,562 | B2 | 8/2024 | Khoryaev et al. |
| 12,063,505 | B2 | 8/2024 | Guo et al. |
| 12,063,657 | B2 | 8/2024 | Panteleev et al. |
| 12,089,278 | B2 | 9/2024 | Wu et al. |
| 12,113,746 | B2 | 10/2024 | Panteleev et al. |
| 2006/0212195 | A1 | 9/2006 | Veith et al. |
| 2009/0150023 | A1 | 6/2009 | Grau et al. |
| 2011/0130905 | A1 | 6/2011 | Mayer |
| 2019/0266264 | A1 | 8/2019 | Michalakis |
| 2019/0311404 | A1 | 10/2019 | Wasserman et al. |
| 2020/0312048 | A1 | 10/2020 | Goluguri et al. |
| 2021/0225155 | A1 | 7/2021 | Potter et al. |
| 2021/0287530 | A1 | 9/2021 | Reichardt et al. |
| 2022/0270177 | A1 | 8/2022 | Chintakindi et al. |
| 2022/0301361 | A1 | 9/2022 | Cawse |
| 2023/0230173 | A1 * | 7/2023 | Chintakindi .......... G06Q 40/08 |
| | | | 705/4 |

OTHER PUBLICATIONS

Extended European Search Report dated Jan. 14, 2026 for European Application No. 25204285.8.

* cited by examiner

100

COLLECTION AND DISTRIBUTION OF TELEMATICS DATA

RELATED APPLICATIONS

This application claims the benefit under 35 U.S.C. § 120 as a continuation of U.S. application Ser. No. 17/684,773, filed Mar. 2, 2022 now U.S. Pat. No. 12,112,586, and titled "COLLECTION AND DISTRIBUTION OF TELEMATICS DATA," which claims the benefit under 35 U.S.C. § 119(e) of U.S. Provisional Application Ser. No. 63/292,505, filed Dec. 22, 2021, and titled "COLLECTION AND DISTRIBUTION OF TELEMATICS DATA," and of U.S. Provisional Application Ser. No. 63/162,364, filed Mar. 17, 2021, and titled "COLLECTION AND DISTRIBUTION OF TELEMATICS DATA." Each of the foregoing applications is incorporated by reference herein in its entirety.

FIELD

Some embodiments described herein are related to techniques for processing and distributing telematics data in accordance with constraints imposed on each of a plurality of recipients, each of which may be subject to different constraints on what data of the telematics data they may receive. The telematics data may be or include data relating to a vehicle or operation of a vehicle, such as data relating to operation of a car. In some such embodiments, third parties may request receipt of telematics data relating to a vehicle and an owner or operator of that vehicle may impose constraints on what telematics data each such third party is entitled to receive, and/or constraints on when or how often such telematics data may be provided. Techniques are described herein for regulating collection and distribution of telematics data in accordance with such requests and constraints. In some such embodiments, an owner/operator may constrain the third party from receiving particular telematics data, but there may be advantages to enabling the third party to receive derivative data that is derived from the data they are not entitled to receive. Specific infrastructures are also described herein for use in some embodiments in facilitating collection and distribution of telematics data, including derivative data, in accordance with requests and constraints.

BACKGROUND

Telematics devices may generate vast quantities of data, which may include data of many different data types. The telematics data may include data about the vehicle or about operation of the vehicle. Data about a vehicle may include information relating to one or more components of the vehicle, configuration of the component(s), one or more values output by the components, information identifying the vehicle or a configuration thereof, or other information. Information related to operation of the vehicle may include information relating to an operation of one or more components or of the vehicle during a time when the vehicle is in an operating mode (e.g., ignition is on, engine is running), either during motion or when remaining in place in an operating mode. Information relating to the operation of the vehicle may include information on a position or motion of the vehicle. Information relating to the operation of the vehicle may include information on a health or status of the vehicle or one or more components of the vehicle. A brief, non-limiting list of telematics data types may include: vehicle identification number (VIN), current odometer reading, current speed, engine RPM, battery voltage, engine coolant temperature, engine coolant level, accelerator pedal position, brake pedal position, various manufacturer specific vehicle DTCs (diagnostic trouble codes), tire pressure, oil level, airbag status, seatbelt indication, emission control data, engine temperature, intake manifold pressure, transmission data, braking information, and fuel level. The amount and/or type of telematics data may change from manufacturer to manufacturer and may evolve with the introduction of additional vehicular technology.

SUMMARY

In some embodiments, a method of processing telematics data includes receiving initial telematics data related to a vehicle from a telematics device and processing the initial telematics data to generate processed telematics data. For each recipient of a plurality of recipients, the method additionally includes determining, from the initial telematics data and/or the processed telematics data, data that is to be made accessible to a recipient. Determining the data that is to be made accessible to the recipient comprises evaluating one or more constraints for the recipient that constrain what data the recipient is permitted to receive and determining what data has been requested to be provided to the recipient. For each recipient of a plurality of recipients, the method additionally includes distributing the determined data to the recipient.

In some embodiments, a system for processing telematics data includes at least one processor and at least one storage medium. Encoded on the at least one storage medium are executable instructions that, when executed by the at least one processor, cause the at least one processor to carry out a method of managing a plurality of subscriber volumes storing telematics data. Each subscriber volume of the plurality of subscriber volumes is associated with a subscriber of telematics data of a plurality of subscribers of telematics data. A subscriber associated with a subscriber volume accesses telematics data via the associated subscriber volume. Each subscriber volume comprises an initial data store configured to store initial telematics data generated by a telematics device associated with a vehicle and a subscriber data store configured to store subscriber telematics data for access by the subscriber associated with the subscriber volume. The subscriber associated with a subscriber volume is not permitted to access the initial data store of the subscriber volume. The method includes distributing the initial telematics data generated by the telematics device associated with the vehicle to each of the plurality of subscriber volumes. Distributing the initial telematics data to the plurality of subscriber volumes includes writing the initial telematics data to each of the initial data stores of the plurality of subscriber volumes. For each subscriber volume, the method includes processing the initial telematics data received at the initial data store of the subscriber volume to generate processed telematics data. For each subscriber volume, the method additionally includes determining, from the initial telematics data and/or the processed telematics data, data that is to be included within the subscriber telematics data for access by the subscriber associated with the subscriber volume. Determining the data that is to be included within the subscriber telematics data includes evaluating one or more constraints for the subscriber associated with the subscriber volume that constrain what data the subscriber is permitted to receive and determining what data has been requested to be provided to the subscriber associated with the subscriber volume. For each subscriber volume, the method additionally includes writing data to the subscriber data store of the subscriber volume, from among the processed telematics data and/or the initial telematics data, in accordance with the determined data that is to be included within the subscriber telematics data.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
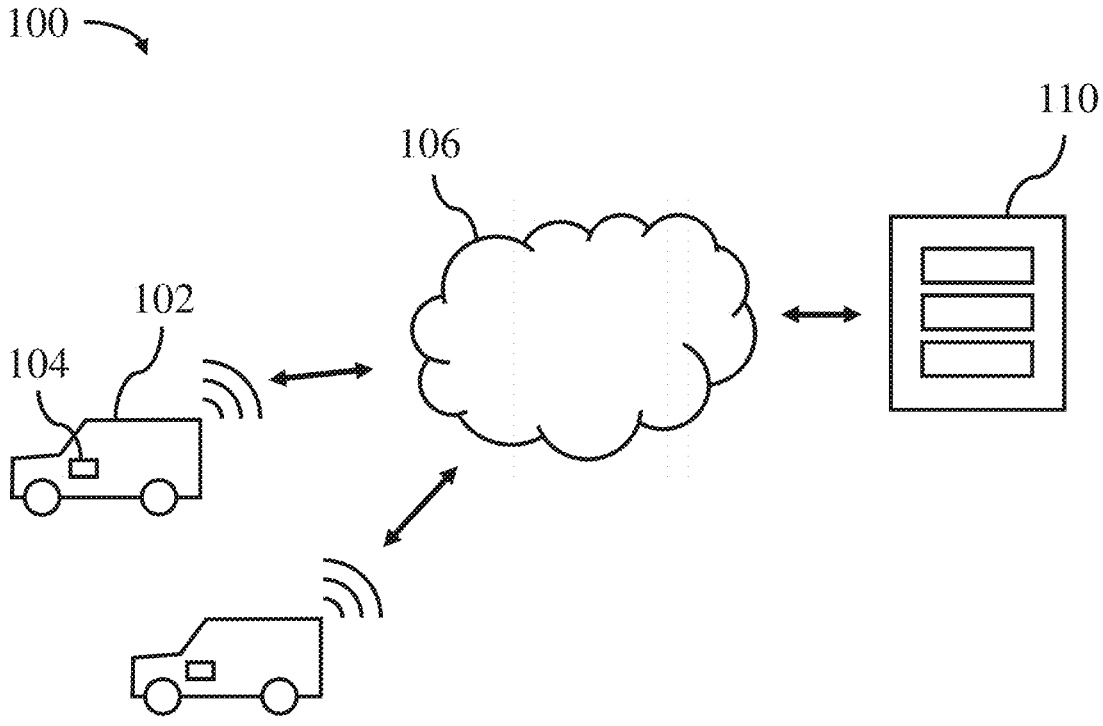
FIG. 1A is a schematic representation of one embodiment of a telematics system that includes a server.

Described herein are examples of methods of processing telematics data to enable transmission of telematics data related to a vehicle to a plurality of recipients in accordance with one or more constraints and/or requests that are specific to each recipient. In some cases, such constraints may be set by a user who may be an owner or operator of a vehicle, and may be related to privacy concerns or other concerns of the user regarding what data is to be provided to each recipient and how often such data is to be shared with each recipient. The user may set different constraints for each recipient. In addition, each recipient may request different data. Accordingly, for telematics data that relates to a vehicle, there may be great variation in what portions of that telematics data is to be provided to each of multiple different recipients. Some methods described herein include receiving initial telematics data from a telematics device related to a vehicle, which may include telematics data that is to be distributed to some recipients and not others (or, in some cases, that is not to be distributed to any recipient). That initial telematics data may be processed to generate processed telematics data, which may include data that is derived from some of the initial telematics data. The method further comprises distributing some of the initial telematics data and/or the processed telematics data to each of a plurality of recipients in accordance with the constraints and requests for each such recipient. In some embodiments, initial telematics data and/or processed telematics data may be deleted upon satisfaction of a condition. For example, all initial telematics data may be deleted following processing and distribution of telematics data to the recipients, or initial telematics data that meets a criterion for deletion may be deleted following processing and distribution of telematics data to the recipients. In some embodiments that include a criterion for deletion, such a criterion for deletion may be that the data is of a type that is private or can be processed to reveal private information.

Also described herein are examples of systems for distributing telematics data, including computer system infrastructures that may provide advantageous arrangements for distribution of telematics data in accordance with different constraints and requests that are specific to each of a plurality of recipients. Some such systems include a plurality of recipient volumes in a server system that store telematics data. In some such cases, each recipient volume may be associated with a recipient of a plurality of recipients. Recipients only have access to their associated volume and not to other volumes. Each recipient may be a subscriber to telematics data, having a particular subscription in which the recipient has requested to receive specified telematics data for one or more specified vehicles. Each recipient volume may include an initial data store configured to store initial telematics data and processed telematics data that is generated from processing the initial telematics data. The associated recipient does not have access to this initial data store of the recipient's volume. Each recipient volume may further include a recipient data store, to which the associated recipient does have access (e.g., the recipient may be able to query or otherwise request/retrieve data from the recipient data store). Telematics data related to a vehicle may be initially written to the initial data store of each recipient volume that is authorized to receive data related to that vehicle, and such initial telematics data may also be processed to generate processed telematics data that is written to the initial data store. The initial data store for a recipient volume (to which the associated recipient does not have access) may thus store a variety of telematics data, including telematics data that the recipient is not permitted to receive or has not requested to receive. Telematics data from that initial data store of that recipient volume may then be written to the recipient data store of the recipient volume from among the initial telematics data and/or the processed telematics data, in accordance with constraints set for a recipient for telematics data related to a vehicle and/or in accordance with requests from a recipient for what data is to be received. In some embodiments, when initial and/or processed telematics data a recipient is authorized to receive is written to the recipient data store, data in the initial data store may be deleted. In some such cases, all data in the initial data store may be deleted following processing and distribution or, in other cases. data in the initial data store that meets a condition may be deleted following processing and distribution. In some embodiments, telematics data (raw telematics data and/or processed telematics data) in a recipient data store may also be deleted upon satisfaction of a condition, such as by deleting private data following a time. As mentioned above, such a condition may be that the data is private. The system may implement such a feature to mitigate risk of inadvertent disclosure or use of private data, while still enabling its processing and/or limited disclosure where authorized.

Often, various entities may be interested in some or all of the telematics data associated with a particular telematics device. For example, an owner of a vehicle in which a telematics device is installed may be interested in data relating to the health of the vehicle, so that the vehicle owner may schedule timely maintenance or repair. As another example, a manager who oversees a fleet of vehicles may be interested in data relating to the position of each vehicle in the fleet, so that the manager may update vehicle routes based on new and evolving information.

Technological approaches have previously been developed for collecting telematics data from a vehicle and distributing that data to entities that have requested the telematics data. To do so, a distribution service based in a server or system of servers (e.g., in a cloud service) is informed of what data is to be collected and configures a telematics device in a vehicle to collect and provide to the distribution service the data that has been requested. Once configured, the telematics device transmits the requested data to the distribution service over the internet and the distribution service relays that received data to the requesting entities.

In some cases, different entities may request being provided with different sets of telematics data, relating to their different interests in the vehicle. Approaches have therefore been previously developed that enabled a distribution service to determine, from among the data that has been received by the distribution service from a telematics device for a vehicle, what data is to be provided to which entity.

While the conventional technological approaches are able to send telematics data to entities, there are concrete limitations and disadvantages of these conventional systems that limit their effectiveness and limit how entities can receive telematics data.

In some cases, an entity may wish to know certain data about operation of a vehicle that cannot be directly obtained from the vehicle by a telematics device. For example, in some cases, vehicle speed data may be information that cannot be directly obtained by a telematics device but that an entity may wish to receive. For example, an owner of a vehicle in which a telematics device is installed may subscribe to an insurance policy that offers discounts for safe driving or that imposes penalties for unsafe driving. The insurance company may wish to receive vehicle speed data to determine whether the vehicle is speeding and, per the policy, whether a discount should be provided to or a penalty should be imposed on the owner of the vehicle. Speed data, as mentioned above, may not be received by a telematics device from the vehicle, but can be determined from telematics data that the telematics device does receive. The telematics device may receive time-stamped raw position data (e.g., from a GPS receiver of the telematics device), and the position data may be processed in connection with the time data to derive speed data (i.e., through determining distance traveled over time). For the insurance company to obtain speed data, the insurance company could receive that position and time telematics data from the telematics device via the distribution service and perform its own calculations of speed.

Accordingly, for the insurance company to determine whether a vehicle is speeding, the telematics data that the insurance company would need to receive would include detailed vehicle position data. However, the owner of the vehicle may not want to share detailed vehicle position data with an insurance company or other entity. Position information may be analyzed to determine locations visited (e.g., specific stores or residences) or to determine behaviors. A vehicle owner may have privacy or safety concerns about sharing detailed vehicle position information. If the vehicle owner does not share the location data with the insurance company, though, the vehicle owner may not gain the benefit of the discounts offered by the safe driving policy.

In conventional approaches to distribution of telematics data, telematics data is collected from a telematics device and then that same telematics data is piped to receiving entities. A user would not be able to specify that position data is to be collected but cannot be provided to the insurance company, or that the insurance company is to be provided with speed information without receiving the associated position information. The limitations of conventional technological approaches to distribution of telematics data mean that a conventional telematics data distribution service would not be able to meet the users' need for providing speed information while satisfying privacy or safety concerns.

The inventor has thus recognized and appreciated that there would be advantages to telematics data distribution techniques that would use telematics data, received for a vehicle, that an entity is not entitled to receive to determine other telematics data that an entity is entitled to receive and that is to be provided to that entity. To continue the example above, it would be advantageous for a telematics data distribution service to collect position and time information from a telematics device for a vehicle, calculate speed data, and provide the speed data (e.g., without the position and time data) to an entity. There are a variety of situations, as well, in which it may be advantageous to retrieve one set of telematics data for a vehicle, use that telematics data to determine additional data, and provide only some of the telematics data and/or the additional data to an entity.

As should be appreciated from the foregoing, conventional data distribution techniques have only retrieved/received from a telematics device for a vehicle the data that was to be provided to a receiving entity. Other data that was not to be provided to any recipient was not collected using these conventional techniques. The inventor has recognized and appreciated that isolated data can often be less meaningful than contextualized data. Additional data may provide useful meaning and context to other data. As such, if an entity who has interest in vehicle telematics data only receives a subset of the telematics data, the entity may be unable to extract relevant insights that are only ascertainable when the received data is contextualized with the other data that was not received. The entity may thus be unable to extract insights or, perhaps worse, due to a lack of context, may extract incorrect insights from the data.

In addition, extracting correct insights from data may rely on receiving data at a sufficient rate. When data is sampled and transmitted at different rates, different insights may appear or certain insights may be masked. Again using the above example, when position data is received at a certain rate, only those data points and those times may be used to determine whether the vehicle was speeding. When the duration between data points is long, there may be times between those data points during which a vehicle may have been speeding, but those instances of speeding may be undetectable from that data. For instance, if given two points 10 miles apart and separated by 12 minutes, processing may reveal that the vehicle may have travelled 50 miles-per-hour. Processing could not reveal, though, if the vehicle speed surpassed a certain threshold speed (e.g., 50 mph) during that time interval. If a certain insight is to be extracted from certain telematics data, it would be advantageous if a telematics data distribution service were to be aware of that insight and ensure that sufficient contextual data is provided and/or that data is provided at a sufficient rate to enable that insight to be extracted.

Further, the inventor has recognized and appreciated that conventional telematics data distribution techniques are limited to only collecting telematics data and then piping that telematics data to entities. Conventional telematics data distribution services are not able to identify telematics data that is to be provided or not to be provided, and are not able to identify telematics data that is to be provided at certain times. There would be advantages to systems that are able to provide certain information to certain entities when criteria are met. For example, a fleet manager for a fleet of vehicles that employees drive during both the workday and following the workday may request to receive position information for the vehicles during work hours, but (to protect employee privacy) not receive position information for the vehicles during work hours when the employees may be using the vehicles for personal errands. A distribution system could determine at different times what telematics data to provide to the fleet manager. As another example, a fleet manager may not be entitled to receive position information for a vehicle unless the vehicle is determined to be speeding, after which the fleet manager may be provided with position information for the vehicle so that the fleet manager may investigate where and why an employee was speeding. As another example, if a telematics system were to determine that a vehicle collision had occurred, then more data may be distributed to the same or additional parties than in a normal scenario, to aid resolution of the vehicle collision. As yet one more example, telematics data may or may not be provided according to predetermined data contracts. If a particular data contract stipulates that position data is to be provided with a specified maximum allowable error and a specified maximum allowable delay, a distribution system could be configured to operate according to the conditions of this contract. If another data contract stipulates that instance of speeding are to be reported, but speed data is only received at a particular rate (e.g., once per minute), a distribution system could be configured to generate an alert if speed data indicative of speeding is received at two successive time points.

In view of the above, the inventor has recognized and appreciated that new data distribution techniques and systems for use with telematics data would have substantial benefits to vehicles and recipients of data.

Described herein are examples of telematics data distribution techniques that may be used to collect telematics data from a vehicle and then stream that data to multiple different recipients, with different recipients receiving different portions of the telematics data. The data that is to be provided to different recipients may be selected in accordance with constraints set by a user (such as an owner or operator of the vehicle) on which recipient(s) may receive what telematics data related to the vehicle, and/or may be selected in accordance with requests (e.g., from a recipient or another user) for what data is to be received by which recipients. In some cases, as discussed below, telematics data that is provided to a recipient may include derivative data that has been derived from some telematics data that the recipient is not entitled to receive. Telematics data may also be deleted when one or more conditions are met. For example, telematics data that is of a type that has been marked private (e.g., by an owner or operator of a vehicle, or an administrator of a telematic data distribution system) may be deleted following processing and/or distribution to the recipient(s) of telematics data. The deleted data may include telematics data that was not processed or distributed, telematics data that was processed to produce derived telematics data and was not itself distributed, telematics data that was distributed to some recipients, or any other telematics data.

Also described herein, for use with these distribution techniques, are examples of computer system infrastructures that may aid in processing and distributing telematics data in accordance with some such distribution techniques. In some examples described below, each recipient of telematics data is associated with a volume in a server system, with each volume including an initial data store and a recipient data store. The recipient, though associated with the volume, may not be permitted access to the initial data store. Initial telematics data, which may be or include raw telematics data as output from a telematics device of a vehicle, is received at a distribution service and provided to the associated volume for each recipient who has requested receipt of telematics data for that vehicle. The initial telematics data is stored in each volume in the initial data store for that volume. Following storage, the initial telematics data is processed to generate processed telematics data, which may include derivative data. The initial telematics data and/or the processed telematics data may then be filtered in accordance with constraints imposed on what telematics data for the vehicle the recipient may receive and in accordance with what data has been requested to be provided to the recipient for the volume. The filtered data may then be stored in the recipient data store for subsequent access by or on behalf of the recipient. Data stored in the initial data store and/or recipient data store may be subsequently deleted. For example, at least some of the initial telematics data may be deleted following processing and/or storing of data in the recipient data store. As another example, following storage in an initial data store or recipient data store, at least some data may at a later time be deleted from the recipient data store, such as following a period of time after storage. The data that is deleted may be data that satisfies a condition, such as data that was not written to a recipient data store, data that is of a type that has been marked private, or other condition(s). Though such a computer system infrastructure can have clear redundancies, especially in storage of data, the inventor has recognized and appreciated that it can also have significant benefits for distribution of data, including speed of processing of data and completeness and contextualizing of data for generation of processed or derivative data for provision to recipients.

The inventor has recognized and appreciated that these techniques and infrastructures may be particularly advantageous when a recipient is to be provided with less than the entirety of the telematics data associated with a telematics device for a vehicle. By allowing each volume access to the entirety of the telematics data for a vehicle when processing initial telematics data, generating derivative data or other processed data, filtering the data, and storing the filtered data in the recipient data store, the distribution service may be able to extract for a recipient insights that would be otherwise unavailable when only limited data was provided direct to a recipient. By providing telematics data to a volume but restricting visibility to only certain portions of the telematics data (e.g., by only storing some of the data in a data store to which a recipient has access), the distribution service enables a user associated with the telematics device to fulfill certain obligations while still retaining data privacy. Continuing with the above example, if a volume associated with the insurance company is provided with the entirety of the telematics data, the distribution service may be able to interrogate all available raw position data to extract speed information at a resolution up to the resolution of the raw position data, even if the raw position data itself is not to be made visible to the insurance company. For instance, if an insurance company is interested in having high resolution speed information for a vehicle between times $T_1$ and $T_2$, the insurance agency would be able to request that data from the telematics data distribution service which would in turn be able to efficiently derive that information from the data available in an initial data store for the volume associated with the insurance company. This stands in contrast to conventional systems, in which the insurance agency may need to send an additional data request to the user that owns/operates the vehicle to grant access to the data (which may be associated with delays), or may need to preemptively request high resolution speed information for all times (which may be associated with unnecessary and/or lengthy calculations of derivative data).

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A is a schematic representation of one embodiment of a telematics system 100. The telematics system includes one or more assets to which telematics data may relate. Such assets may include vehicles 102, or may be or include any suitable form of vehicle. In some cases in which the vehicle is a land-based vehicle, the vehicle may be or include a personal or commercial automobile, such as a sedan, van, pickup truck, box truck, semi-trailer truck, bus, or other vehicle. In some cases, an asset may include a storage that may not itself be mobile but may be from time to time associated with one or more vehicles to be moved from place to place. For example, a shipping container, trailer, or other storage may be an asset. Telematics data that is collected, processed, and distributed in accordance with techniques herein may relate to assets. When an asset is or includes a storage, telematics data related to the asset at a time may include data related to a vehicle with which the storage is associated at the time, including examples of telematics data related to a vehicle discussed above. During a time that such a storage is not associated with a vehicle, telematics data may relate to the storage such as a position of the storage or a status of the storage. Such a status may include, in some cases, information on whether the storage is locked or unlocked, a temperature of a storage area of the storage, an operating or maintenance status of heating or cooling functionality, or other information related to the storage or operation of the storage.

For ease of description and readability, examples are described below and elsewhere herein in which an asset is or includes a vehicle and telematics data relates to the vehicle, but it should be appreciated that embodiments are not so limited and telematics data may relate to other forms of assets in some embodiments.

Each vehicle 102 of the telematics system 100 is associated with a telematics device 104 that collects initial telematics data related to the vehicle 102 and transmits the initial telematics data via one or more computer communication networks 106 to one or more destinations. Such destinations may include a server 110 associated with a telematics data distribution service. While, for ease of illustration, one server 110 is shown, it should be appreciated that server 110 may be implemented as one or more servers, including a distributed system of servers that operate together, such as a cloud service. Such server(s) 110 may be implemented as any suitable form of computing hardware, as embodiments are not limited in this respect.

The telematics device 104 of FIG. 1A may include suitable hardware and/or software configured to collect, sense, receive, process, store, and/or transmit any appropriate telematics data associated with a vehicle. A telematics device may be integrated into the vehicle, or may be removably connected to a vehicle, such as through a diagnostic port (e.g., an on-board diagnostics (OBD) or OBD-II port). In some embodiments, a telematics device 104 may include a hand-held device, which may include a mobile device such as a cellular telephone or smart phone. The telematics device 104 may communicate with one or more components of the vehicle 102 or otherwise receive from the vehicle 102 telematics data related to the vehicle 102. The telematics device 104 may then transmit the telematics data from the device 104 and vehicle 102, to a destination remote from the vehicle 102.

Transmission by the telematics device 104 via the network(s) 106 may include any suitable transmission technique, including communication to a satellite, through a ground-based station, over a cellular network, over a computer network, over the Internet, and/or using any other suitable channel. Accordingly, network(s) 106 may include any suitable one or combination of wired and/or wireless, local- and/or wide-area communication networks, including one or more private or enterprise networks and/or the Internet. In some embodiments, telematics device 104 may transmit data using a wireless connection to a wireless wide area network (WWAN) such as a cellular network, after which it may be transmitted via one or more other networks (e.g., wired networks) to a destination such as a server 110. In some embodiments, a telematics device 104 streams data (e.g., contemporaneously with the data being generated and/or received by the telematics device 104, or in real time) to the server 110 via the network(s) 106.

The initial telematics data is received at server 110, which may be remote from the vehicle 102 (e.g., geographically remote) and may, in some cases, be associated with a remote monitoring site that monitors telematics data for multiple vehicles and may include or be associated with a telematics data distribution service. The server 110 may receive the telematics data from the telematics device 104 and may provide the telematics data to a telematics data distribution facility, which may implement techniques described herein. The telematics data distribution facility may act to distribute telematics data to one or more recipients who are to receive telematics data for the vehicle 102 (and, for other vehicles, to distribute telematics data for such other vehicles to recipients who are to receive telematics data for each such other vehicle) in accordance with constraints on telematics data that is to be received by each recipient.

Not pictured in FIG. 1A are other entities or devices of or affiliated with each recipient, which obtain data from each recipient data store of each recipient volume for or on behalf of the associated recipient. Embodiments are not limited to a particular manner of recipients interacting with the recipient data store(s) of the associated volume. In some embodiments, the server 110 may host and execute ones or more processes (e.g., an application) for each recipient, which interacts with the associated recipient data store of the recipient volume. Such a process may be stored within and executed within a context of the associated volume, in some embodiments. Such a process may interact with a remote user that is or is acting on behalf of the recipient, such as by receiving requests for telematics data or other requests via network 106. In some such embodiments, the process for a recipient may be configured to perform one or more operations on the telematics data periodically, occasionally, on occurrence of a condition, or at other times. For example, the process may obtain and analyze telematics data and output a result of the analysis to a remote recipient. In such a case, any suitable analysis may be done, as embodiments are not limited in this respect. In other embodiments, a remote device (e.g., a laptop or desktop personal computer, a mobile device, a smart phone, a tablet computer, a server, or other suitable device) operating on behalf of the recipient, or used by the recipient or a user acting on behalf of the recipient, may be executing one or more processes that issue a query to the recipient data store of the recipient volume. The distribution facility or another suitable process of the server 110 (e.g., one executing within the context of the associated volume 120 for the recipient) may retrieve telematics data from the recipient data store of the associated volume and output it in response to the request. Embodiments are not limited to any particular manner of providing data to recipients.

Figure 1B:
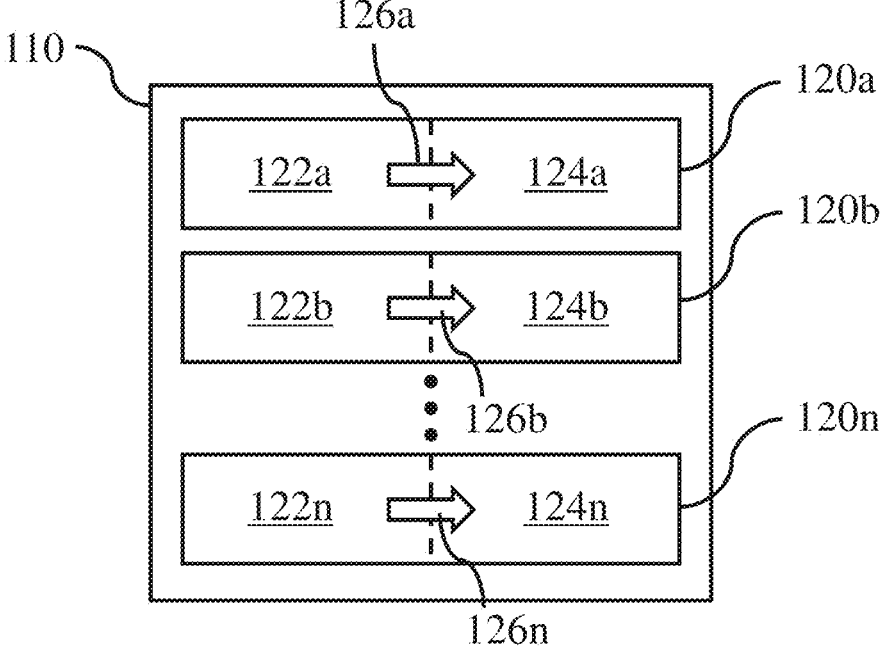
FIG. 1B is a schematic representation of the server of FIG. 1A.

FIG. 1B is a schematic representation of one illustrative implementation of the server 110 of the example of FIG. 1A, including data stores maintained by a telematics data distribution facility operating in accordance with techniques described herein. The server 110 of FIG. 1B includes multiple recipient volumes 120, including a first recipient volume 120a, a second recipient volume 120b, up until an nth recipient volume 120n, where n can be a suitable integer. Each recipient volume 120 is associated with a different recipient of telematics data. Each such recipient may receive telematics data related to a single vehicle or multiple vehicles. For example, a first recipient may be authorized to receive first telematics data associated with a first vehicle, while a second recipient may be authorized to receive second, third, and fourth telematics data associated with second, third, and fourth vehicles, respectively.

It should be appreciated that, in some embodiments, telematics data associated with a particular vehicle may be made available to multiple different recipients. In general, telematics data associated with a particular vehicle may be made available to any suitable number of recipients, and a particular recipient may be authorized to receive telematics data associated with any suitable number of vehicles. It should be appreciated that the present disclosure is not limited to any specific relationship between the number of vehicles (and the associated telematics data) and the number of recipients.

Referring again to FIG. 1B, each recipient volume 120 comprises an initial data store 122 and a recipient data store 124. This is labeled in FIG. 1B as initial data store 122a for first recipient volume 120a, initial data store 122b for second recipient volume 120b, initial data store 122n for recipient volume 120n, and each associated recipient data store is labelled as 124a, 124b, 124n.

In some embodiments, the telematics data distribution facility stores the telematics data it receives from a telematics device 104 and associated with a particular vehicle 102 in the initial data store 122 of the recipient volume 120 associated with each recipient that is to receive data related to that vehicle 102. This stored telematics data may include telematics data that the associated recipient is not authorized to access (e.g., due to one or more applicable constraints) or that the associated recipient has not requested to receive. In some embodiments, as described above and in more detail below, the telematics data distribution facility stores all telematics data that is output by a telematics device 104 and that the telematics data distribution service receives (which may be all telematics data that the telematics device is able to collect for a vehicle, and/or all telematics data that the vehicle is able to output/provide), in the initial data store 122 of the recipient volume for each recipient that is to receive telematics data for a given vehicle. Stated differently, in some embodiments, as long as a particular recipient is authorized to access and/or has requested receipt of at least some telematics data associated with a particular vehicle, all telematics data generated by a telematics device associated with that vehicle is transmitted to the telematics data distribution facility and, upon receipt, is stored by the telematics data distribution facility in the initial data store 122 of that recipient's recipient volume 120.

Accordingly, the telematics data distribution facility stores the telematics data received for a vehicle in multiple different recipient volumes 120 (e.g., at least in the initial data store 122) when multiple recipients are to receive at least some of the telematics data for that vehicle.

However, while the telematics data transmitted from the telematics device and received by the telematics data distribution facility is stored in the initial data store 122 of each recipient volume 120, the associated recipient for each volume is not permitted access to the initial data store 122. Instead, for each recipient volume 120, the associated recipient may only access telematics data after the telematics data distribution facility transfers the telematics data to the corresponding recipient data store 124. That is, while the associated recipient is not permitted to access the initial data store 122 of the recipient volume 120, the recipient is permitted to access the recipient data store 124 of the recipient volume 120.

In accordance with techniques described herein, the telematics data distribution facility transfers data for each recipient volume from the initial data store 122 of the volume to the recipient data store 124 of the volume according to a data processing configuration 126 labeled as configuration 126a for volume 120a, configuration 126b for the volume 120b, and configuration 126n for volume 120n. The data processing configuration 126 for a volume 120 (associated with a recipient) may relate to a particular vehicle and reflect what telematics data for that vehicle (1) the recipient is permitted to receive, and/or (2) has been requested for the recipient to receive.

With respect to (1), as discussed above and in greater detail below, there may be constraints imposed on what telematics data for a vehicle a particular recipient is able to receive. These constraints may differ between recipients, such that one recipient is able to receive a certain type of telematics data related to a vehicle and another recipient is not able to receive that type of telematics data related to that vehicle. The constraints may differ between vehicles, too. A recipient may not be able to receive a certain type of telematics data for one vehicle but may be able to receive that type of telematics data for another vehicle. In addition or as an alternative to constraints specifying type(s) of telematics data, temporal constraints may be specified. For example, constraints on a time of day, week, month, or year a recipient is able to receive telematics data or certain telematics data or type(s) of telematics data may be specified. As another example, a frequency or interval at which a recipient is able to receive telematics data or certain telematics data or type(s) of telematics data may be specified. As another example, conditional constraints may be specified, identifying one or more conditions that are to be met for telematics data or certain type(s) of telematics data to be distributed to a recipient. Embodiments are not limited to constraining receipt of telematics data in any particular manner. Examples of techniques by which constraints may be set, and of users who may set constraints, are described below.

With respect to (2), as discussed above and in greater detail below, a telematics data distribution service may receive a request for a particular recipient (or recipients) to receive telematics data for one or more vehicles. The request may have been sent by the recipient, by an owner/operator of the vehicle, or by another suitable entity. The request may specify the telematics data a recipient is to receive, a category or type of telematics data the recipient is to receive, a temporal characteristic of telematics data distribution (e.g., as discussed above, when or how often telematics data is to be received), one or more conditions to be met for telematics data to be received, a task that is to be fulfilled using telematics data (from which particular type(s) of telematics data or temporal characteristic(s) may be determined), or other suitable manner of identifying telematics data and how to receive it. Examples of techniques by which requests may be specified and received, and of users who may specify requests for recipients, are described below.

Embodiments are not limited to the data processing configuration 126 specifying the constraint(s) and request(s) for a particular recipient volume in any particular manner. The constraint(s)/request(s) may be reflected in the configuration 126 in a variety of ways.

In some embodiments, a data processing configuration 126 for a volume may further specify one or more policies or conditions that apply to storage of and/or deletion of telematics data. For example, a data processing configuration 126 may specify whether, when, and/or how to determine whether to delete telematics data from a data store or volume. For example, the data processing configuration 126 may specify a schedule by which, occasion at which, or frequency at which to delete telematics data. Examples of a frequency may be hourly, daily, weekly, or other suitable timeline, and examples of a schedule include times and/or days at which to delete data. Examples of an occasion upon which to delete data include upon performance of a task or other occurrence of an event, such as when a telematics data distribution facility starts or completes performance of a task. Such a task may be processing telematics data and/or distributing data to a recipient or recipient data store. A data processing configuration 126 may specify whether and/or how to determine whether to delete telematics data by specifying what telematics data is to be deleted or the condition(s) or criterion/criteria to be evaluated to determine whether telematics data is to be deleted. Such conditions/criteria may define one or more types of data that are to be deleted. This may include the type(s) of data that are known to be related to private data or that have been configured by a vehicle owner or operator or by an administrator of a telematics system as private data. Privacy conditions/criteria may also define one or more types of data that have resulted from processing or have been derived from such telematics data type(s) that have been indicated to be private. Such private data may include any of a variety of type(s) of data, as should be appreciated from the discussion herein, including data that may be processed to reveal behaviors, preferences, or habits of a consumer (e.g., location data). As another example, conditions/criteria for deletion may specify that telematics data that is received and that is not to be distributed to any recipient or to a recipient for a volume is to be deleted following processing and distributing of the received telematics data (e.g., when a batch of telematics data is received, processed, and distributed, the un-distributed data is to be deleted). In some cases, a data processing configuration 126 may specify multiple different policies, such as a timing at which to delete some type(s) of data and a different timing at which to delete other type(s) of data. In some embodiments, one configuration may apply to private data stored in an initial data store and a different configuration may apply to private data stored in a recipient data store. For example, a configuration may specify that private data is to be deleted from an initial data store once processing and distribution of a batch of data (that included the private data) is completed, and a configuration may specify that private data is to be deleted from a recipient data store daily, weekly, once used in the recipient data store, or on another timing.

In accordance with techniques described herein, the telematics data distribution facility may regulate transfer of telematics data to a recipient data store of a recipient volume in accordance with this configuration 126 for a volume 120. Examples of the process the telematics data distribution facility may follow in transferring data from the initial data store 122 to the recipient data store 124 are described in greater detail below, such as in reference to FIGS. 3A and 3B. In this way, although a recipient volume 120 may store in the initial data store 122 telematics data associated with a particular vehicle 102 (e.g., all the telematics data that may be generated for that vehicle 102), in accordance with the constraint(s)/request(s) reflected in the data processing configuration 126, the recipient may only be able to access some of that telematics data from the recipient data store 124.

Figure 1C:
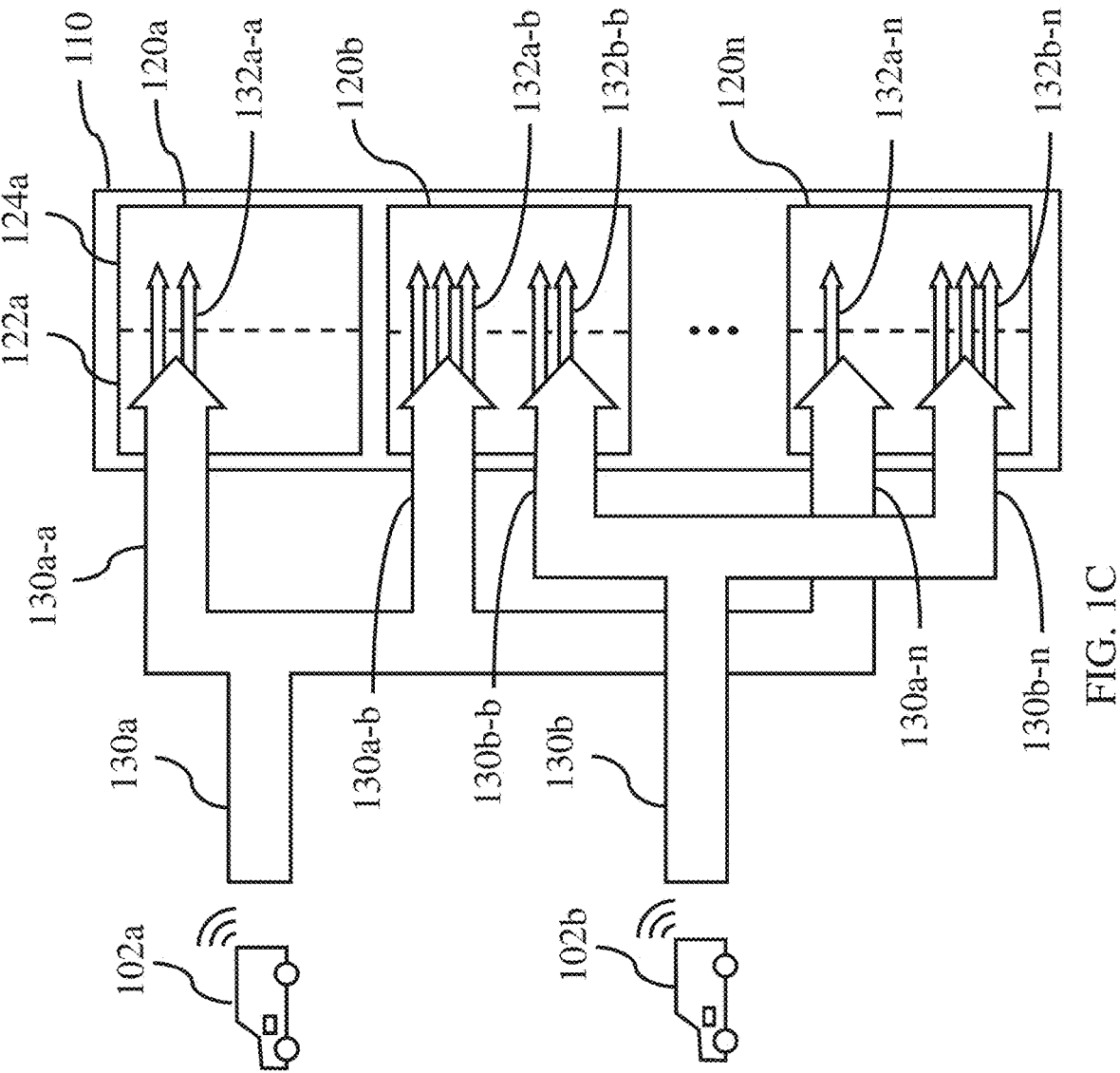
FIG. 1C is a schematic representation of an illustrative flow of data in the telematics system of FIG. 1A.

FIG. 1C is a schematic representation of an illustrative flow of data in the telematics system 100 of the example of FIG. 1A. In this sketch, data flows along the specified arrows, from vehicles 102 to recipient volumes 120 within the server 110. While only two vehicles 102a and 102b are shown in the schematic of FIG. 1C, it should be appreciated that any suitable number of vehicles 102 may be included in a telematics system 100, as this disclosure is not limited in this regard. Similarly, while only three recipient volumes 120a, 120b, and 120n are shown in the schematic of FIG. 1C, it should be appreciated that any suitable number of recipient volumes 120 may be included in a telematics system 100, as this disclosure is not limited in this regard.

In FIG. 1C, telematics devices associated with each vehicle 102a, 102b transmit initial telematics data 130 to the telematics data distribution facility which, upon receipt, determines the recipient(s) that is to receive telematics data for each vehicle and stores the received telematics data in the recipient volume 120 of each determined recipient that is to receive data associated with that vehicle. As should be appreciated from the discussion above, in the embodiment of the figure, the telematics data distribution facility stores the telematics data from the vehicle 102a in the respective initial data store(s) 122 of the determined recipient volume(s) 120 for the determined recipients for each vehicle. In the case of FIG. 1C, the facility determines that the recipients associated with volumes 120a, 120b, and 120n will receive at least some of the telematics data 130a from the vehicle 102a and, in response, telematics data 130a from vehicle 102a is stored by the telematics data distribution facility in the respective initial data stores 122a, 122b, and 122n of recipient volumes 120a, 120b, and 120n. Similarly, telematics data 130b related to the vehicle 102b is stored by the telematics data distribution facility in initial data stores 122b, 122n of volumes 120b, 120n, in response to determining that only the recipients associated with volumes 120b, 120n (and not the recipient associated with volume 120a) will receive at least some of the telematics data 130b.

The telematics data 130*a*, 130*b* that is transmitted to and received by the telematics data distribution facility may be or include initial telematics data, which may be or include raw telematics data. Raw telematics data may be data that is in the same form or format as it was first received by a telematics device from a vehicle to which the raw telematics data relates, and/or in the same form or format in which that data was stored by the telematics device prior to transmission to the distribution facility.

It should be appreciated from the foregoing discussion that, in the embodiment of FIG. 1C, when the distribution facility receives initial telematics data 130*a* from a telematics device, the distribution facility stores that same initial telematics data 130*a* in the recipient volume for each recipient that is to receive at least some of the telematics data for the vehicle 102*a*. Analogous statements may be made for initial telematics data 130*b*. As shown in the figure, the distribution facility provides the initial telematics data 130*a* to the recipient volume 120*a* as the initial telematics data 130*a-a* and to the recipient volume 120*b* as the initial telematics data 130*a-b*, and to the recipient volume 120*n* as the initial telematics data 130*a-n*. The same telematics data 130*a* is copied and provided to each of the volumes for storage. The same is true of telematics data 130*b* and data 130*b-b* and 130*b-n*.

In some embodiments, when a telematics device collects and transmits telematics data for a vehicle to the distribution facility, all available telematics data that could be generated and output related to a vehicle is collected from the vehicle and transmitted. Accordingly, when the distribution facility receives the telematics data 130*a*, 130*b* in these embodiments, each set of data reflects all telematics data for the related vehicle 102*a*, 102*b*. Additionally, the telematics data 130*a-a*, 130*a-b*, 130*a-n*, 130*b-b*, 130*b-n* also reflect all telematics data for the vehicle. Accordingly, in these embodiments, each volume stores, in at least the initial data store, initial telematics data that reflects all telematics data that could be obtained for a vehicle.

As described above, the telematics data distribution facility transfers only certain telematics data from the initial data stores 122 to the associated recipient data stores 124 of each volume 120 as recipient data 132 to be available to the recipient associated with the volume 120. Specifically, regarding data associated with the first vehicle 102*a*, the distribution facility transfers recipient data 132*a-a* from the initial data store 122*a* to the recipient data store 124*a*, recipient data 132*a-b* from the initial data store 122*b* to the recipient data store 124*b*, and recipient data 132*a-n* from the initial data store 122*n* to the recipient data store 124*n*. It should be appreciated that the recipient data 132 is specific to each recipient and need not be the same as the recipient data 132 (from the same vehicle) transferred to a different recipient. For example, recipient data 132*a-a* may differ from recipient data 132*a-b*, even though both sets of recipient data are associated with the same vehicle 102*a*, and both sets of recipient data are associated with the same initial telematics data 130*a* (as stated above, initial telematics data 130*a-a* is the same as initial telematics data 130*a-b*). As will be explained in greater detail below, recipient data 132*a-a* may differ from recipient data 132*a-b* due to different data processing configurations 126*a* and 126*b* that are specific to the different recipients, illustrated schematically in FIG. 1B.

Turning to the telematics data 130*b* related to the second vehicle 102*b*, the telematics data distribution facility transfers recipient data 132*b-b* from the initial data store 122*b* to the recipient data store 124*b*, and recipient data 132*b-n* from the initial data store 122*n* to the recipient data store 124*n*. It should be appreciated from the discussion above that the data processing configuration 126 may depend at least in part on the particular vehicle and the particular recipient with which the data processing configuration is associated. As such, even if the same initial telematics data from two different vehicles were transmitted to the initial data store of a volume associated with a particular recipient, the recipient data associated with the two vehicles need not be the same. That is, in reference to FIG. 1C, even if initial telematics data 130*a-b* (i.e., the initial telematics data 130*a* transmitted from vehicle 102*a* to recipient volume 120*b*) happened to include identical types of telematics data as initial telematics data 130*b-b* (i.e., the initial telematics data 130*b* transmitted from vehicle 102*b* to recipient volume 120*b*), the associated recipient data 132*a-b* and 132*b-b* transferred by the distribution facility to the associated recipient data store need not be identical.

As mentioned above, the arrows of FIG. 1C illustrate examples of data flows of telematics data in systems according to some embodiments. In some embodiments, the arrows shown in FIG. 1C reflect data streams of the system. For example, telematics devices 104 may stream telematics data they receive related to the vehicles 102*a*, 102*b* to the telematics data distribution facility, and the distribution facility may stream the data to the associated recipient volumes and, from the initial data stores, stream recipient data to the recipient data stores. In some such embodiments, when the data is streamed via one or more communication networks, computer data buses, or other transmission techniques, the data may be streamed by being transmitted contemporaneously with receipt of the data, such as by streaming the data in real time through the aspects of the system. Through the data flows shown in FIG. 1C, one stream of telematics data (e.g., of telematics data 130*a* related to vehicle 102*a*) can be converted into multiple streams of that data for multiple recipients (e.g., streams of telematics data 130*a-a*, 130*a-b*, 130*a-n*, then streams of telematics data 132*a-a*, 132*a-b*, 132*a-n*, and so on).

Described above are examples of systems that may be used in some embodiments to implement techniques described herein, and infrastructures that may be implemented in such systems. Described below are examples of processes that may be used in some embodiments to implement these techniques. It should be appreciated that the systems of FIGS. 1A-1C may be used with any suitable processes, including processes that do not follow the examples of FIGS. 2-3B, as other processes are possible. And it should be appreciated that the processes of FIGS. 2-3B may be implemented with other systems, including systems that do not follow the examples of FIGS. 1A-1C, as other systems are possible.

Figure 2:
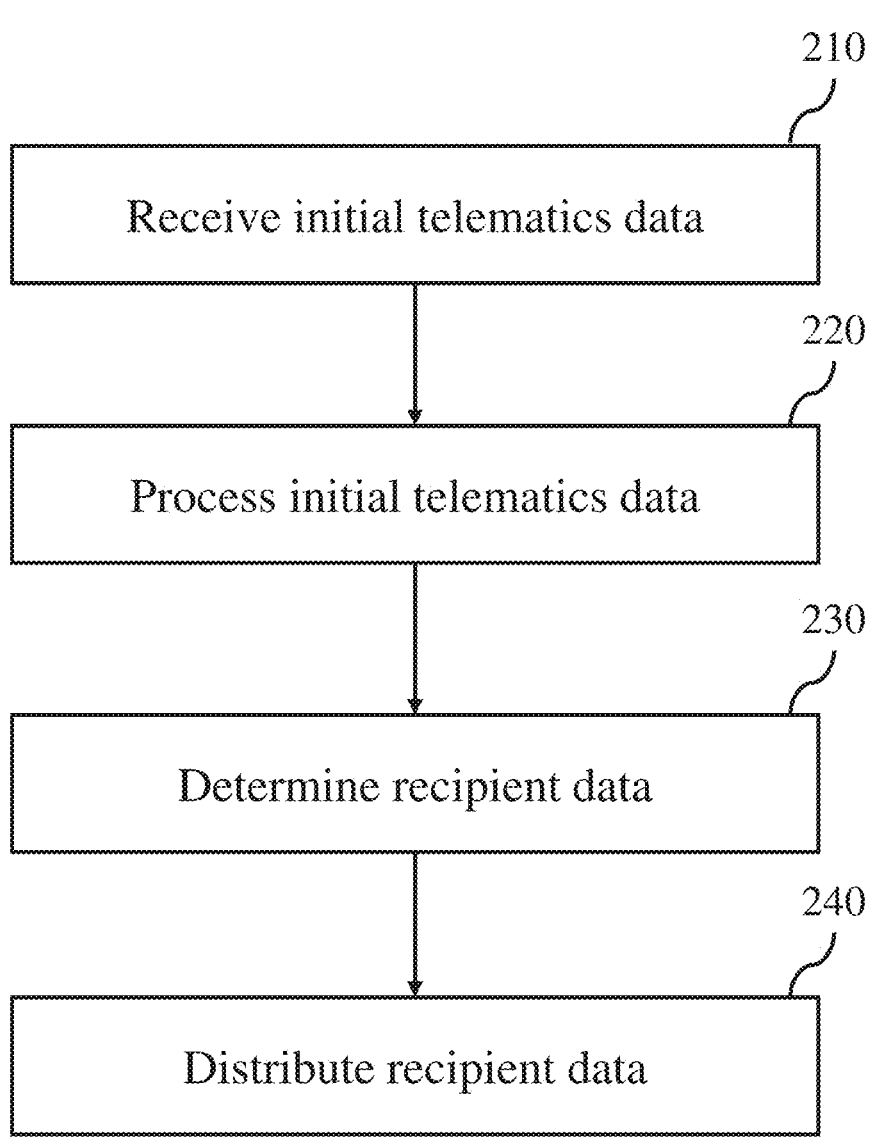
FIG. 2 is a flowchart representing one embodiment of a method of processing telematics data.

FIG. 2 is a flowchart representing one embodiment of a method 200 of processing telematics data that may be implemented by a telematics data distribution facility. The distribution facility may be associated with a telematics data distribution service.

Prior to the process 200, multiple users who may be owners and/or operators of vehicles (or other assets) may associate with the telematics data distribution service. Telematics devices may be pre-associated with the telematics data distribution service prior to use or installation or may be configured to be associated with the telematics data distribution service. When associated, the telematics devices may be configured to transmit received telematics data to the telematics data distribution facility of the distribution service. The telematics devices may be installed in some cases or may otherwise be initiated. In some cases, the telematics devices may be configured with what telematics data is to be collected, examples of processes for which are described below.

In addition, prior to the start of process 200 of FIG. 2, one or more recipients may associate with the telematics data distribution service to receive telematics data. Each recipient may associate with the service to receive data for one or more vehicles. The recipients may subscribe with the service, such as by submitting a subscription request that identifies the vehicle(s) for which each subscriber is subscribing to receive related telematics data. In some cases, the recipients may be charged a fee for subscribing to telematics data with the telematics data distribution service. In some such cases, the fee that is charged may vary based on the data that the recipient requests and receives. Accordingly, in some embodiments, a recipient/subscriber may indicate to the service in a subscription request what telematics data for each of one or more vehicles the recipient/subscriber would like to receive, and in some embodiments may specify temporal characteristics such as when or how often to receive the telematics data, and may be charged an amount based on a type of telematics data (e.g., raw data and/or derived data) and/or an amount of telematics data that is to be received, or when or how often the recipient is to receive the telematics data.

As should be appreciated from the foregoing discussion, the telematics data distribution facility may also be configured, based on input from users (e.g., in the subscription requests from recipients, or in other communications from other users), with input regarding constraints on what telematics data related to what vehicle recipients are able to receive and regarding requests for what telematics data related to what vehicle each recipient is to receive. The telematics data distribution facility may distribute telematics data in accordance with a configuration set per such constraints and requests. In some cases, constraints and/or requests may be specified in a data contract, such as a data contract between a user associated with a vehicle and a recipient of telematics data associated with the vehicle.

For ease of description, the process 200 will be described in connection with telematics data related to one vehicle. It should be appreciated from the foregoing discussion and FIG. 1C, however, that a telematics data distribution facility may process telematics data for a number of vehicles, including a large number of vehicles.

The process 200 begins at block 210, in which the telematics data distribution facility receives initial telematics data related to a vehicle. The initial telematics data may be received from a telematics device, in some embodiments, as a stream of telematics data output by the telematics device. The initial telematics data may include raw telematics data, which may be telematics data in a same form or format as initially output by a vehicle or otherwise as initially received or stored by a telematics device. The initial telematics data may include a number of items of telematics data, some of which some recipients may be constrained from receiving and/or some of which no recipient may have requested to receive. In some embodiments, the initial telematics data related to a vehicle may include all telematics data associated with the telematics device of a vehicle at a particular time. This may be, for example, all telematics data that may be available regarding and/or that may be output from the vehicle at the particular time. In some embodiments, the initial telematics data may be received at a server executing the telematics data distribution facility.

At block 220, the telematics data distribution facility processes the initial telematics data. Processing the initial telematics data may include determining additional telematics data from the initial telematics data, such as by generating new telematics data from processing performed on the initial telematics data. Generating the new telematics data may include deriving new derivative telematics data from the initial telematics data. The telematics data distribution facility may perform any suitable processing on telematics data, including any suitable analysis, as embodiments are not limited in this respect.

At block 230, the telematics data distribution facility determines for each recipient that is to receive telematics data related to the vehicle the recipient data that is to be provided to the recipient. As discussed above and in more detail below, the recipient data for each recipient may be less than all of the telematics data that was included in the initial telematics data for the vehicle, which was received in block 210. The distribution facility determines the recipient telematics data for a recipient in accordance with constraint(s) and request(s) applicable to that recipient. In some cases, the recipient telematics data may include processed telematics data that results from the processing of block 220. In some such cases, the recipient telematics data may include processed telematics data but not include initial telematics data from which that processed telematics data was determined. For example, derived telematics data may be included in the recipient data, while the initial telematics data from which the derived telematics data was derived may not be included in the recipient data.

At block 240, the distribution facility distributes the determined recipient data to each such recipient. The distribution to the recipient may be performed in any suitable manner, as embodiments are not limited in this respect. In some cases, the data may be transmitted to a recipient, including streamed to a recipient. In some cases (e.g., embodiments described above in connection with FIGS. 1A-IC), the recipient telematics data may be distributed to a recipient by storing the recipient telematics data in a data store accessible to the recipient.

After the recipient telematics data is distributed to each recipient, the process 200 ends. Following the process 200, each recipient may have access to and may use the recipient telematics data, including by performing analyses on it or using it for any other purpose. The telematics data distribution facility may, in some cases, continue executing by returning to block 210 to receive more telematics data.

Following the process 200, including following the processing and/or the distribution of telematics data, the distribution facility may further act to delete telematics data. The facility may determine whether to delete and then delete, in accordance with that determination, telematics data from one or more initial data stores and/or one or more recipient data stores. For example, in accordance with one or more data processing configurations, the facility determines what telematics data qualifies for deletion and a timing at which to delete that telematics data. In one particular example, the facility may determine, upon receiving, processing, and distribution telematics data, what of the received and/or processed telematics data (e.g., raw or processed telematics data) satisfies criteria for deletion (e.g., for being of a type of data that is private) and deletes that data upon completion of the processing and/or the distribution. The data may be deleted from an initial data store and/or a recipient data store. In a case that data is deleted from both data stores, different data may be deleted at different times.

It should be appreciated that the disclosed method is not limited to the order of steps presented in the figures. Rather, the order of steps could vary in different embodiments.

A telematics data distribution facility may implement the actions of process 200 in a variety of ways. Details regarding ways in which individual steps of the process 200 may be implemented in some embodiments are described below in reference to FIGS. 3A and 3B. It should be appreciated, however, that embodiments are not limited to operating in accordance with the implementation of FIGS. 3A-3B.

Figure 3A:
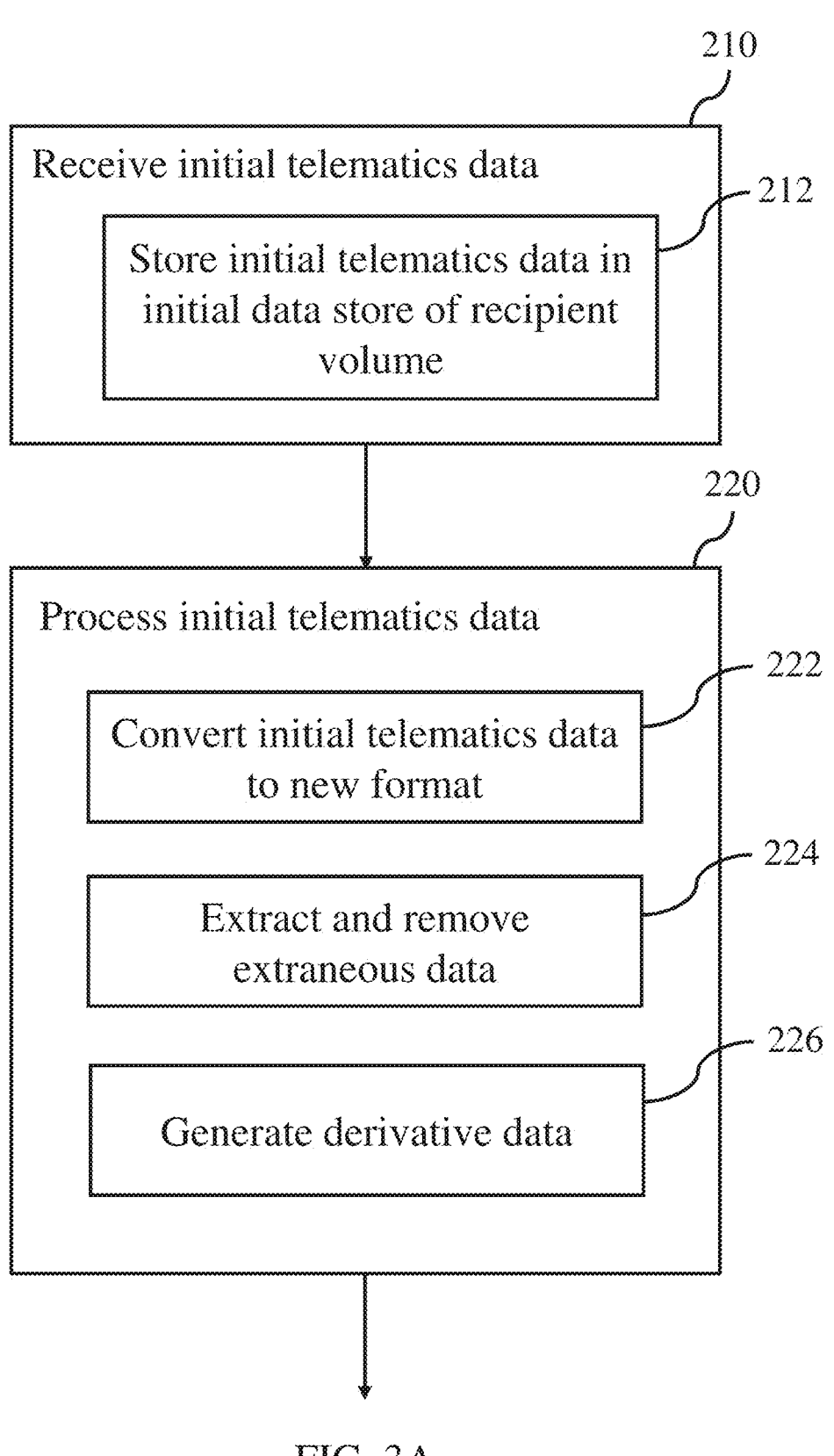
FIG. 3A is a flowchart representing one embodiment of a method of receiving and processing initial telematics data.

FIG. 3A is a flowchart representing one embodiment of a method of receiving and processing initial telematics data, which may be implemented by a telematics data distribution facility. FIG. 3A illustrates further detail regarding operations illustrated in the flowchart of FIG. 2. Reference characters shared between the two figures (e.g., block 210) refer to the same elements.

The process of FIG. 3A starts with the telematics data distribution facility receiving initial telematics data at block 210. In some embodiments, the distribution facility receiving initial telematics data in block 210 includes receiving initial telematics data at a server, such as server 110 of telematics system 100, discussed above in relation to FIG. 1. In some embodiments, receiving initial telematics data includes (at block 212) storing initial telematics data at an initial data store of a recipient volume, such as initial data store 122 of recipient volume 120, discussed above in relation to FIG. 1. In some embodiments, the initial telematics data may be filtered or otherwise modified prior to storage in an initial data store of a recipient volume, or in any other suitable storage medium. Such filtering or modifying may include any of the operations described herein as a part of determining data to be stored in a recipient data store, or other suitable data processing operations. In a scenario in which multiple recipients are to receive telematics data associated with a particular vehicle, the distribution facility may store received initial telematics data related to that vehicle in multiple initial data stores of multiple recipient volumes, for those multiple recipients.

After initial telematics data is received at block 210, the distribution facility processes the initial telematics data at block 220. It should be appreciated that the processing of initial telematics data may occur separately for each recipient, as the processing of initial telematics data may be performed by the distribution facility within separate recipient volumes. In some embodiments, processing of initial telematics data by the distribution facility may be associated with a data processing configuration, such as data processing configuration 126 of telematics system 100, discussed above in relation to FIG. 1. Processing initial telematics data by the distribution facility may include any one, some, or all of: converting initial telematics data to a new format (such as at block 222), extracting and removing extraneous data (such as at block 224), and generating derivative data (such as at block 226). Each of these steps will be described in detail below. It should be appreciated that processing initial telematics data need not include all or any of these steps. Additionally, it should be appreciated that processing initial telematics data may include other steps, as the disclosure is not limited in this regard.

At block 222, the distribution facility converts the initial telematics data to a new format. In some embodiments, initial telematics data received by the distribution facility may include raw vehicle data that is expressed in a format that is particular to whatever messaging protocol may have been used to generate the data (e.g., J1939 syntax). However, in some embodiments, there may be benefits associated with converting the data format. Such conversion may include converting the data to a format that is usable by an application associated with the recipient data store or with a recipient, or that is known to be used by a recipient or known to be used to access the telematics data to be provided to the recipient. It should be appreciated that initial telematics data may be converted to any suitable format, as the disclosure is not limited in this regard.

At block 224, the telematics data distribution facility extracts and removes extraneous data. Extraneous data may include any of the initial telematics data that is neither distributed to a recipient (e.g., the recipient associated with a particular recipient volume in which the processing of block 220 is being done) nor used to generate processed data. For example, if the initial telematics data includes data from a three-axis accelerometer, the initial telematics data may include acceleration data for each of the three axes. However, in this example, the distribution facility may be configured with information indicating that, or may determine that, acceleration data associated with motions in a vertical direction is not to be distributed to the recipient and not to be used to generate processed data. Thus, in this case, the distribution facility may determine vertical acceleration data to be extraneous and may extract and remove that data from the initial telematics data.

At block 226, the distribution facility generates derivative data. Derivative data may include any data that is derived from the initial telematics data. Using an example presented earlier, a telematics device may not have direct access to vehicle speed data but may have access to time-stamped raw position data. As such, this time-stamped raw position data may be included in the initial telematics data. Processing this initial telematics data may include deriving speed data from the time-stamped raw position data. Of course, deriving speed data from position and time data is only one example of generating derivative data, and it should be appreciated that the disclosure is not limited to the specific examples of generating derivative data presented herein. Rather, generating derivative data may include generating any data that is based at least in part on at least a part of the initial telematics data.

Figure 3B:
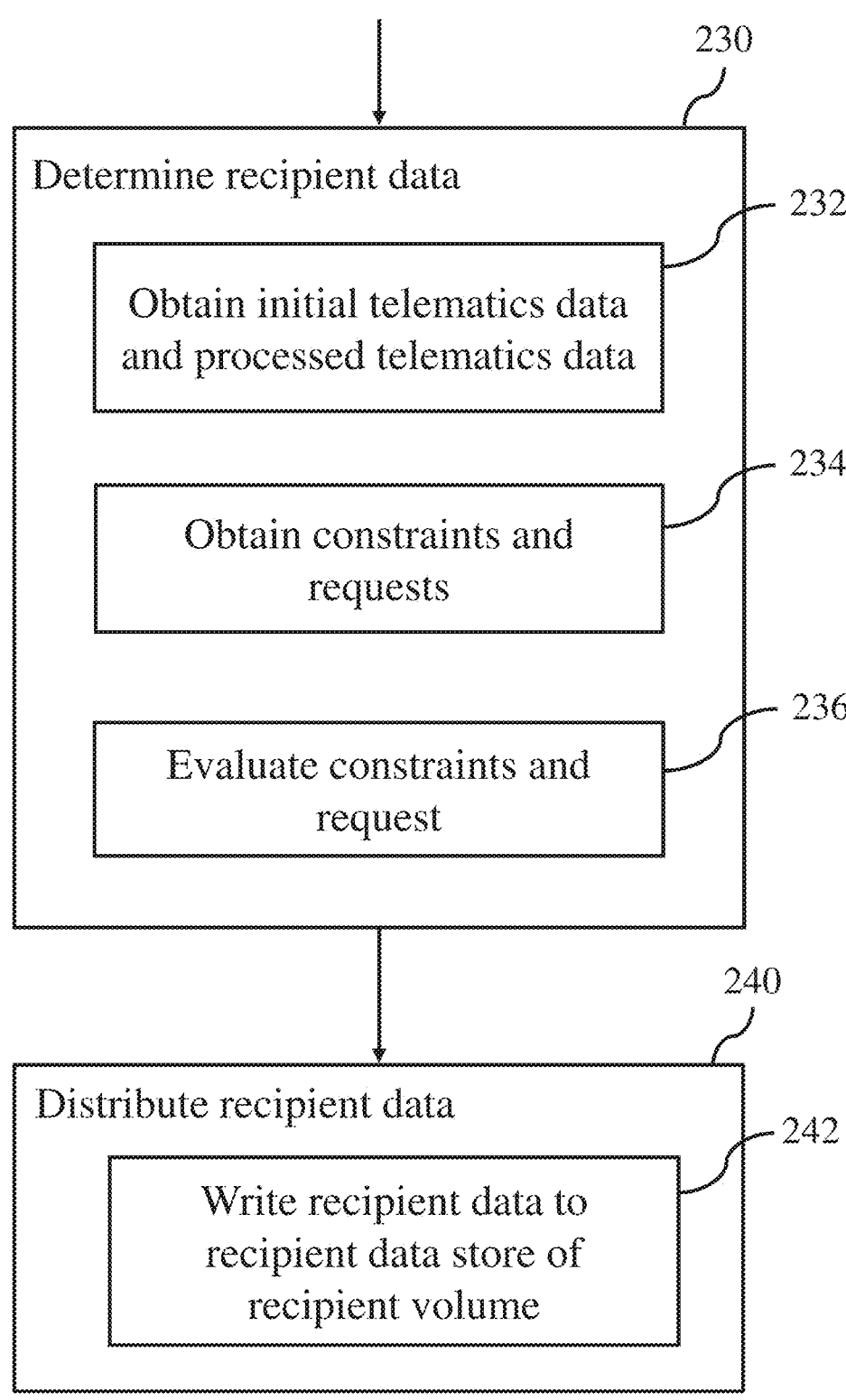
FIG. 3B is a flowchart representing one embodiment of a method of determining and distributing recipient data.

FIG. 3B is a flowchart representing one embodiment of a method of determining and distributing recipient data, which may be implemented by a telematics data distribution facility. FIG. 3B illustrates further detail regarding operations illustrated in the flowchart of FIG. 2. Reference characters shared between the two figures (e.g., block 230) refer to the same elements. In accordance with the discussion presented above in connection with FIG. 2, the process of FIG. 3B may be understood as a continuation of the process of FIG. 3A. That is, after initial telematics is received and processed (as in FIG. 3A), the recipient data may be determined and distributed (as in FIG. 3B).

In FIG. 3B, the telematics data distribution facility determines recipient data at block 230. In some embodiments, the determination of recipient data may be associated with a data processing configuration, such as data processing configuration 126 of telematics system 100 discussed above in relation to FIG. 1. Determining recipient data by the distribution facility may include any or all of: receiving initial telematics data and processed telematics data (such as at block 232), receiving constraints and requests (such as at block 234), and evaluating constraints and requests (such as at block 236). Each of these steps will be described in detail below. It should be appreciated that determining recipient data need not include all or any of these steps. Additionally, it should be appreciated that determining recipient data may include other steps, as the disclosure is not limited in this regard.

At block 232, the telematics data distribution facility obtains initial telematics data and processed telematics data, such as an output of earlier operations performed by the distribution facility (e.g., the operations of blocks 210, 220 of FIGS. 2-3A). It should be appreciated that processed telematics data may include derivative data, although other types of processed data are also contemplated, and the disclosure is not limited in this regard.

At block 234, the distribution facility obtains constraints and requests applicable to distribution of the telematics data for the particular vehicle to the particular recipient. The constraints/requests may be obtained at block 234 from storage, such as from configuration information (e.g., configuration 126). Though, as discussed above, prior to the start of the processes of FIGS. 2-3B, the telematics data distribution facility may also receive/obtain the constraints and requests from users. In some cases, constraints and/or requests may be received as part of subscription requests, as mentioned above.

Examples of constraints are discussed above. In some embodiments, constraints originate from one or more users associated with the telematics data. For example, an operator of a vehicle in which a telematics device is installed may impose constraints on how telematics data from the telematics device is to be distributed to various recipients. It should be appreciated that constraints may be specific to one or more particular recipients. For example, if a user associated with certain telematics data has authorized two different recipients to receive that telematics data and has imposed constraints, the constraint(s) imposed for the first recipient may differ from the constraint(s) imposed for the second recipient. Constraints may be universal or specified. For example, a user may impose a universal constraint that states that location data should not be shared with any recipients. However, a user may alternatively or additionally impose a specific constraint, such as a data sharing termination constraint. A data sharing termination constraint may terminate the sharing of data with one or more recipients. In some embodiments, a data sharing termination constraint may be associated with a trigger. For example, a temporal trigger may be imposed such that, after a certain amount of time or after a certain date, a data sharing termination constraint may be issued and some specified data may no longer be shared with one or more specified recipients. For example, if a user rents a vehicle from a rental agency, the user may impose a data sharing termination constraint such that data is no longer shared after the user returns the rental vehicle.

While some examples relating to constraints on telematics data presented herein describe a user who may be an owner or operator of a vehicle, it should be appreciated that different types and different numbers of users may be associated with the same telematics data. A user associated with telematics data may include an owner of a vehicle in which a telematics device is installed, an operator of a vehicle in which a telematics device is installed, an owner of a telematics device, a monitor of a vehicle in which a telematics device is installed (e.g., a fleet manager, a user associated with a rental car company, a user associated with an insurance company), or any other user who may have interest in the telematics data. Further, it should be appreciated that the systems and methods described herein may be applicable to scenarios in which multiple users are associated with the same telematics data. For example, an operator of a rental car (e.g., the person who has rented and is driving the rental car) may be a first user associated with particular telematics data, and an employee of the rental car company may be a second user associated with the same telematics data. It should be appreciated that, in some embodiments, multiple users associated with the same telematics data may share, constrain, or otherwise interact with that same telematics data. Continuing the above example, constraints on what telematics data is shared may originate from the operator of the rental car, the employee of the associated rental car company, both the operator and the employee, some other user, or any combination of the above.

Turning from constraints to requests, requests may originate from a recipient. That is, a recipient may request certain telematics data associated with one or more vehicles. Of course, it should be appreciated that requests may be specific to particular vehicles or telematics devices. For example, a single recipient may request different data from two different vehicles. Examples of requests (e.g., that may be submitted as a part of a subscription) are discussed above.

At block 236, the distribution facility evaluates constraints and requests applicable to a recipient for telematics data related to a vehicle. Generally, requests may be understood as defining or expanding what telematics data is to be distributed to a recipient, while constraints may be understood as limiting the telematics data to be distributed to a recipient. For example, absent any requests or constraints, a default state may be that no data associated with a particular vehicle is transmitted to a particular recipient (even if that recipient has been authorized to receive telematics data generally). If the recipient requests certain telematics data related to a vehicle, then the requested telematics data for the vehicle may be transmitted to the recipient. However, if a user associated with the vehicle imposes a constraint on what telematics data is to be shared with the recipient, the data request from the recipient may be evaluated in light of the user constraint. In a sense, the data request from the recipient and the user constraint may be cross-referenced by the distribution facility to determine what data is to be distributed to the recipient. In scenarios in which the set of requested telematics data and the set of constrained telematics data overlap, the data common to both sets (i.e., the data that has been both requested by the recipient and constrained by the user) is evaluated by the distribution facility. In some embodiments, constraints may take priority over requests, such that data that is subject to a constraint is not shared in violation of the constraint, even if requested by a recipient. In some embodiments, constraint/request discrepancies may be evaluated based at least in part on the data in question. That is, whether or not some particular data is to be shared may be an individual determination based, at least in part, on the constraints on and requests for that data, as well as additional processing configurations associated with the data itself. These additional processing configurations may be associated with the data type, quantity, size, or any other relevant characteristic of the data. For example, in some embodiments, location data that has been constrained may never be shared with a recipient even if the recipient specifically requests location data, while acceleration data may be shared with a requesting recipient even if the user issues a data sharing constraint on the acceleration data.

After the recipient data is determined by the distribution facility at block 230, the distribution facility distributes the recipient data at block 240. Distributing recipient data may include (at block 242) writing the recipient data to a recipient data store of a recipient volume, such as recipient data store 124 of recipient volume in the telematics system 100 of FIG. 1. In other embodiments, recipient data may be distributed to a recipient in other ways.

Techniques operating according to the principles described herein may be implemented in any suitable manner. Included in the discussion above are a series of flow charts showing the steps and acts of various processes that distribute telematics data related to one or more vehicles to one or more recipients, in accordance with constraints and/or requests. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application, for example as a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 406 of FIG. 4 described below (i.e., as a portion of a computing device 400) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIGS. 1A-1C, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

Figure 4:
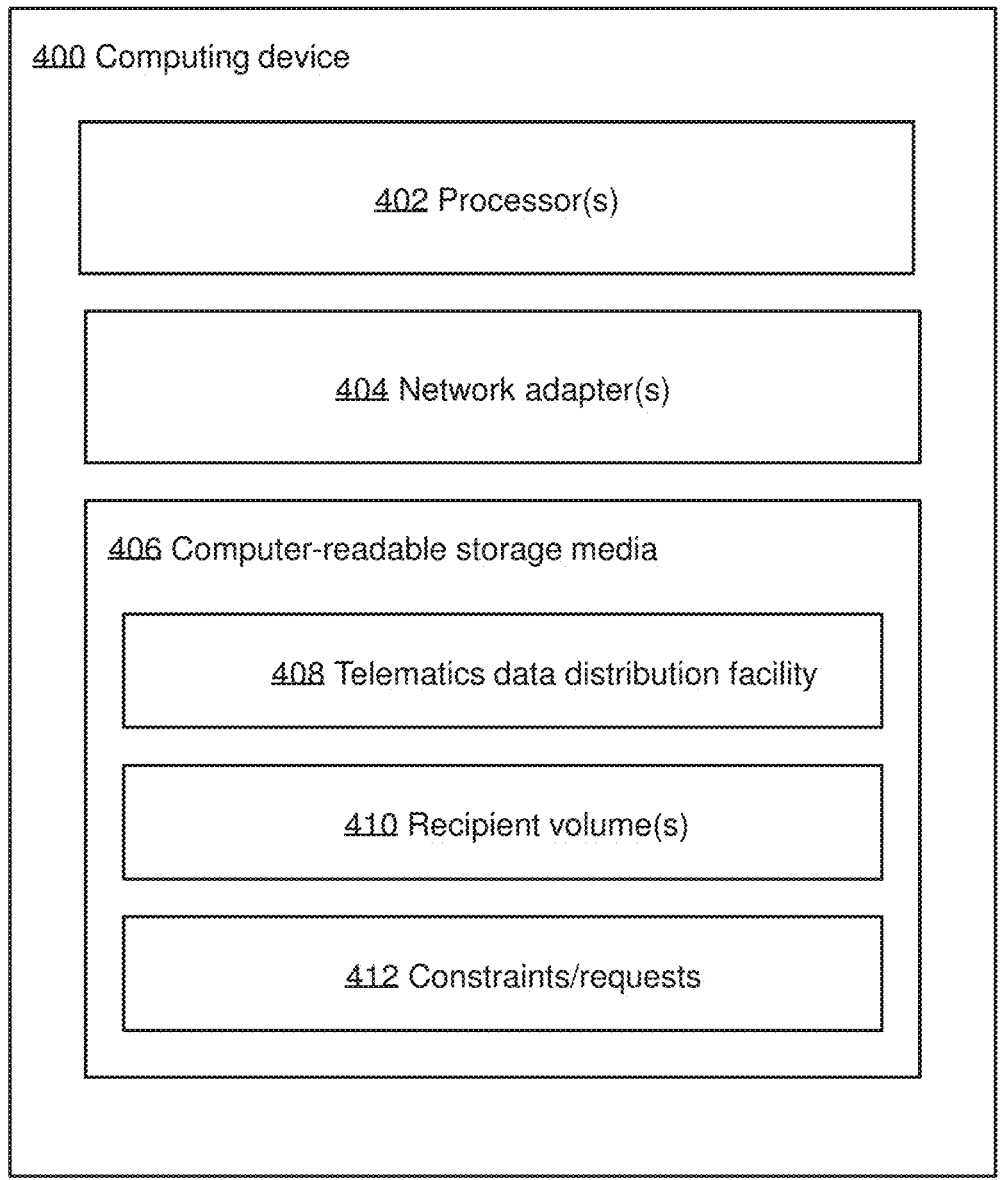
FIG. 4 is a schematic representation of one embodiment of software.

FIG. 4 illustrates one exemplary implementation of a computing device in the form of a computing device 400 that may be used in a system implementing techniques described herein, although others are possible. It should be appreciated that FIG. 4 is intended neither to be a depiction of necessary components for a computing device to operate as a telematics data distributor in accordance with the principles described herein, nor a comprehensive depiction.

Computing device 400 may comprise at least one processor 402, a network adapter 404, and computer-readable storage media 406. Computing device 400 may be, for example, a desktop or laptop personal computer, a personal digital assistant (PDA), a smart mobile phone, a server, or any other suitable computing device. Network adapter 404 may be any suitable hardware and/or software to enable the computing device 400 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 406 may be adapted to store data to be processed and/or instructions to be executed by processor 402. Processor 402 enables processing of data and execution of instructions. The data and instructions may be stored on the computer-readable storage media 406.

The data and instructions stored on computer-readable storage media 406 may comprise computer-executable instructions implementing techniques which operate according to the principles described herein. In the example of FIG. 4, computer-readable storage media 406 stores computer-executable instructions implementing various facilities and storing various information as described above. Computer-readable storage media 406 may store a telematics data distribution facility that carries out any of the techniques described herein for distribution of telematics data. Media 406 may further store one or more recipient volume(s) 410 that may include data stores discussed above for receiving, storing, and distributing telematics data, and constraints/requests 412 that may be used by the distribution facility 408 to determine a manner in which to distribute telematics data for each vehicle to each recipient.

While not illustrated in FIG. 4, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

The invention claimed is:

1. A method comprising:

receiving telematics data related to a vehicle from a telematics device;

processing the telematics data to generate processed telematics data;

determining, based on one or more constraints associated with a recipient that constrain what data for the vehicle the recipient is permitted to access, recipient data associated with the telematics data and/or the processed telematics data that the recipient is permitted to access; and making the recipient data accessible to the recipient.

2. The method of claim 1, wherein processing the telematics data to generate the processed telematics data comprises generating, from the telematics data, derivative data that is derived from at least some of the telematics data.

3. The method of claim 1, wherein making the recipient data accessible to the recipient comprises making vehicle speed data accessible to the recipient.

4. The method of claim 3, wherein making the recipient data accessible to the recipient comprises making the vehicle speed data accessible while not making vehicle location data accessible to the recipient.

5. The method of claim 1, wherein determining, based on one or more constraints associated with a recipient, recipient data associated with the telematics data and/or the processed telematics data that the recipient is permitted to access comprises evaluating a constraint received from a user associated with the telematics device.

6. The method of claim 5, wherein evaluating the constraint received from the user associated with the telematics device comprises evaluating a data sharing termination constraint received from the user.

7. The method of claim 6, further comprising terminating making the recipient data accessible to the recipient.

8. The method of claim 1, further comprising not making accessible at least some of the telematics data and/or the processed telematics data to the recipient.

9. The method of claim 8, further comprising:

deleting the at least some of the telematics data and/or the processed telematics data that is not to be made accessible to the recipient.

10. The method of claim 1, further comprising:

identifying a portion of the telematics data and/or the processed telematics data that satisfies at least one condition; and deleting the portion of the telematics data and/or the processed telematics data that satisfies the at least one condition.

11. The method of claim 10, wherein identifying the portion that satisfies the at least one condition comprises identifying data of the telematics data and/or the processed telematics data that satisfies at least one privacy condition.

12. The method of claim 1, further comprising storing the telematics data in a data store of a recipient volume associated with the recipient, wherein the recipient is not permitted to access the data store of the recipient volume.

13. The method of claim 12, wherein making the recipient data accessible to the recipient comprises writing the recipient data to a recipient data store of the recipient volume, wherein the recipient is permitted to access the recipient data store of the recipient volume.

14. A system comprising:

at least one processor; and at least one storage medium having encoded thereon executable instructions that, when executed by the at least one processor, cause the at least one processor to carry out a method comprising:

receiving telematics data related to a vehicle from a telematics device;

processing the telematics data to generate processed telematics data;

generating, based on one or more constraints associated with a subscriber that constrain what data for the vehicle the subscriber is permitted to access, subscriber data associated with the telematics data and/or the processed telematics data that the subscriber is permitted to access; and writing the subscriber data to a subscriber data store thereby making the subscriber data accessible to the subscriber.

15. The system of claim 14, wherein:

generating subscriber data comprises generating derivative data that is derived from at least some of the telematics data; and writing the subscriber data to the subscriber data store comprises writing at least some of the derivative data to the subscriber data store.

16. The system of claim 15, wherein writing the subscriber data to the subscriber data store comprises not writing the telematics data to the subscriber data store.

17. The system of claim 14, wherein the method comprises converting at least some of the telematics data from a first format to a second format, wherein the second format is usable by an application that has access to the subscriber data store.

18. The system of claim 14, wherein writing the subscriber data to the subscriber data store comprises extracting and removing at least some of the telematics data from the subscriber data store.

19. The system of claim 14, wherein the method comprises receiving, from a user associated with the vehicle, at least one of the one or more constraints for the subscriber that constrain what data the subscriber is permitted to access.

* * * * *